(12) United States Patent
Gueguen

(10) Patent No.: US 9,672,424 B2
(45) Date of Patent: Jun. 6, 2017

(54) GENERATION OF HIGH RESOLUTION POPULATION DENSITY DATA SETS THROUGH EXPLOITATION OF HIGH RESOLUTION OVERHEAD IMAGERY DATA AND LOW RESOLUTION POPULATION DENSITY DATA SETS

(71) Applicant: DigitalGlobe, Inc., Westminster, CO (US)

(72) Inventor: Lionel Gueguen, Longmont, CO (US)

(73) Assignee: DigitalGlobe, Inc., Westminster, CO (US)

(*) Notice: Subject to any disclaimer, the term of this patent is extended or adjusted under 35 U.S.C. 154(b) by 0 days.

(21) Appl. No.: 14/976,400

(22) Filed: Dec. 21, 2015

(65) Prior Publication Data

US 2016/0188976 A1 Jun. 30, 2016

Related U.S. Application Data

(62) Division of application No. 14/063,309, filed on Oct. 25, 2013, now Pat. No. 9,230,169.

(60) Provisional application No. 61/871,691, filed on Aug. 29, 2013.

(51) Int. Cl.
*G06K 9/00* (2006.01)
*G06K 9/66* (2006.01)

(52) U.S. Cl.
CPC .......... *G06K 9/00637* (2013.01); *G06K 9/66* (2013.01)

(58) Field of Classification Search
CPC ............................. G06K 9/00637; G06K 9/66
USPC ....................................................... 382/103
See application file for complete search history.

(56) References Cited

U.S. PATENT DOCUMENTS

| 8,005,656 B1* | 8/2011 | Ankory ............... G06Q 10/04 382/103 |
| 2013/0195328 A1* | 8/2013 | Tanji .................... G06T 7/0012 382/128 |
| 2014/0032271 A1 | 1/2014 | Nordstrand |

FOREIGN PATENT DOCUMENTS

JP 2010019048 A 1/2010

OTHER PUBLICATIONS

Mennis, Jeremy, and Torrin Hultgren. "Intelligent dasymetric mapping and its application to areal interpolation." Cartography and Geographic Information Science 33.3 (2006): 179-194.*
Jeremy Mennis et al., "Intelligent Dasymetric Mapping and Its Application to Areal interpolation", Cartography and Geographic Information Science, vol. 33, Issue 3, pp. 170-194. 2006.
Ming-Dawa Su et al., "Multi-layer multi-class dasymetric mapping to estimate population distribution", Science of the Total Environment, vol. 408, Issue 20, pp. 4807-4816, Sep. 5, 2010.
(Continued)

*Primary Examiner* — Amandeep Saini
(74) *Attorney, Agent, or Firm* — Marsh Fischmann & Breyfogle LLP; Jonathon A. Szumny; Robert G. Crouch

(57) ABSTRACT

Utilities (e.g., systems, methods, etc.) for automatically generating high resolution population density estimation data sets through manipulation of low resolution population density estimation data sets with high resolution overhead imagery data (e.g., such as overhead imagery data acquired by satellites, aircrafts, etc. of celestial bodies). Stated differently, the present utilities make use of high resolution overhead imagery data to determine how to distribute the population density of a large, low resolution cell (e.g., 1000m) among a plurality of smaller, high resolution cells (e.g., 100m) within the larger cell.

18 Claims, 6 Drawing Sheets

(56) References Cited

OTHER PUBLICATIONS

Maria de Belem Costa Freitas Martins et al., "Redistributing Agricultural Data by a Dasymetric Mapping Methodology", Agricultural and Resource Economics Review, 2012, vol. 41, Issue 3, pp. 351-366, Dec. 2012.

Mitchel Langford, "Rapid facilitation of dasymetric-based population interpolation by means of raster pixel maps", Computers, Environment and Urban Systems, vol. 31, Issue 1, pp. 19-32, Jan. 2007.

Georgios K. Ouzounix, Martino Pesaresi, and Pierre Soille, "Differential Area Profiles: Decomposition Properties and Efficient Computation," IEEE Transactions on Pattern Analysis and Machine Intelligence, Dec. 20, 2011.

Georgios K. Ouzounis, Martino Pasaresi and Lionel Gueuguen, "A New Compact Representation of Differential Morphological Profiles," Global Security and Crisis Management Unit, Apr. 2012.

Sathya Ramesh: High Resolution Satellite Images and LiDAR Data for Small-Area Building Extraaction and Population Estimation, Dec. 2009, Retrieved from the Internet: URL: https://digital.library.unt.edu/ark:/67531/metadc12188/m2/1/high res d/thesis.pdf.

Xiaohang Liu: "Dasymetric Mapping With Image Texture", ASPRS Annual Conference Proceedings, Denver, Colorado, May 1, 2004.

Xiaoying Jin et al: "Automated Building Extraction from High-Resolution Satellite Imagery in Urban Areas Using Structural, Contextual, and Spectral Information", EuraSip Journal on Advances in Signal Processing, vol. 2005, No. 14, Jan. 1, 2005.

Martino Pesaresi et al: "A new compact representation of morphological profiles: report on first massive VHR image A processing at the JRC", SPIE—International Society for Optical Engineering. Proceedings, vol. 8390, Apr. 23, 2012.

Hwahwan Kim et al: "Pycnophylactic 10 interpolation revisited: integration with the dasymetric-mapping method", International Journal of Remote Sensing, vol. 31, No. 21, Nov. 15, 2010.

\* cited by examiner

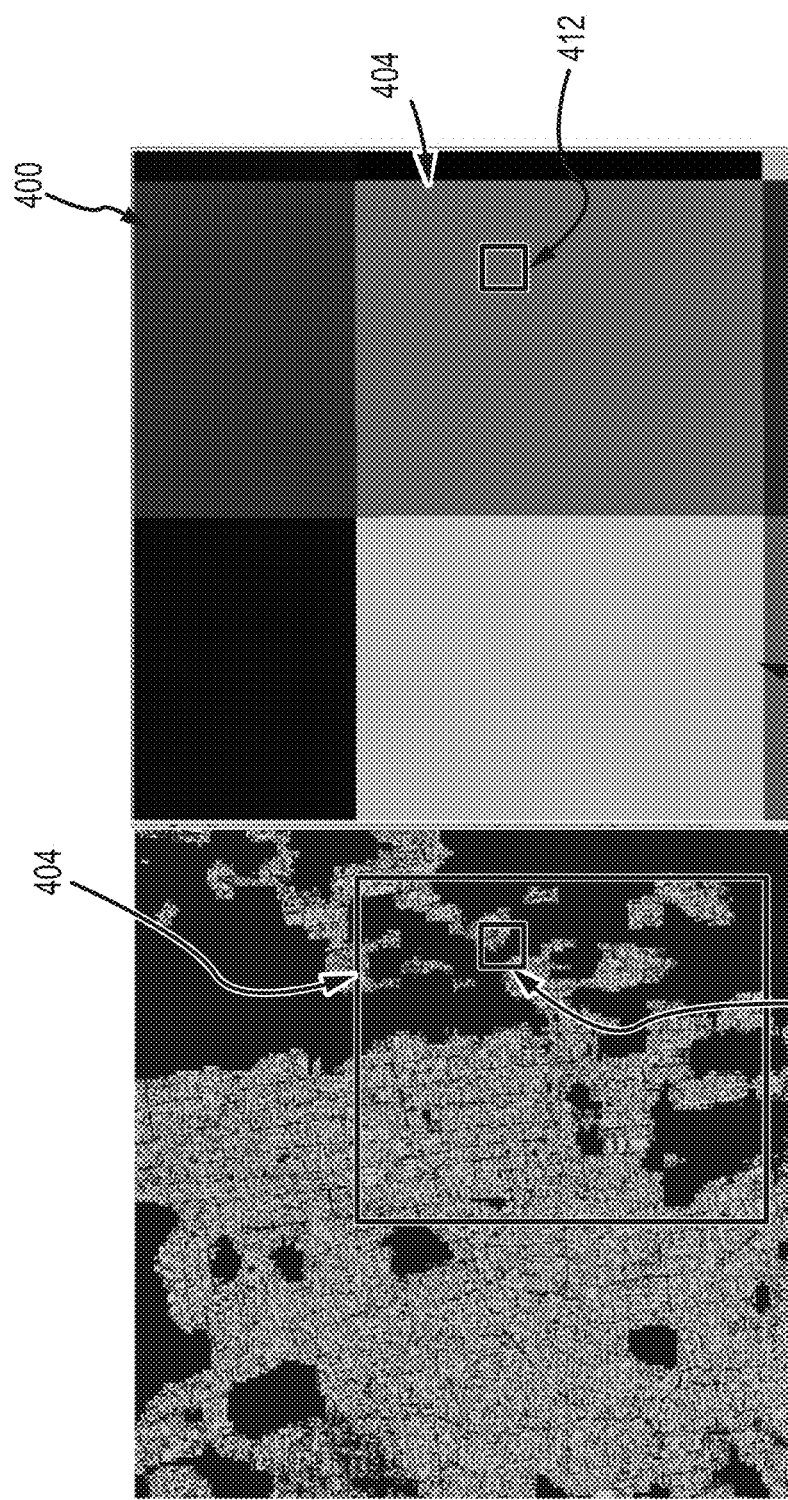

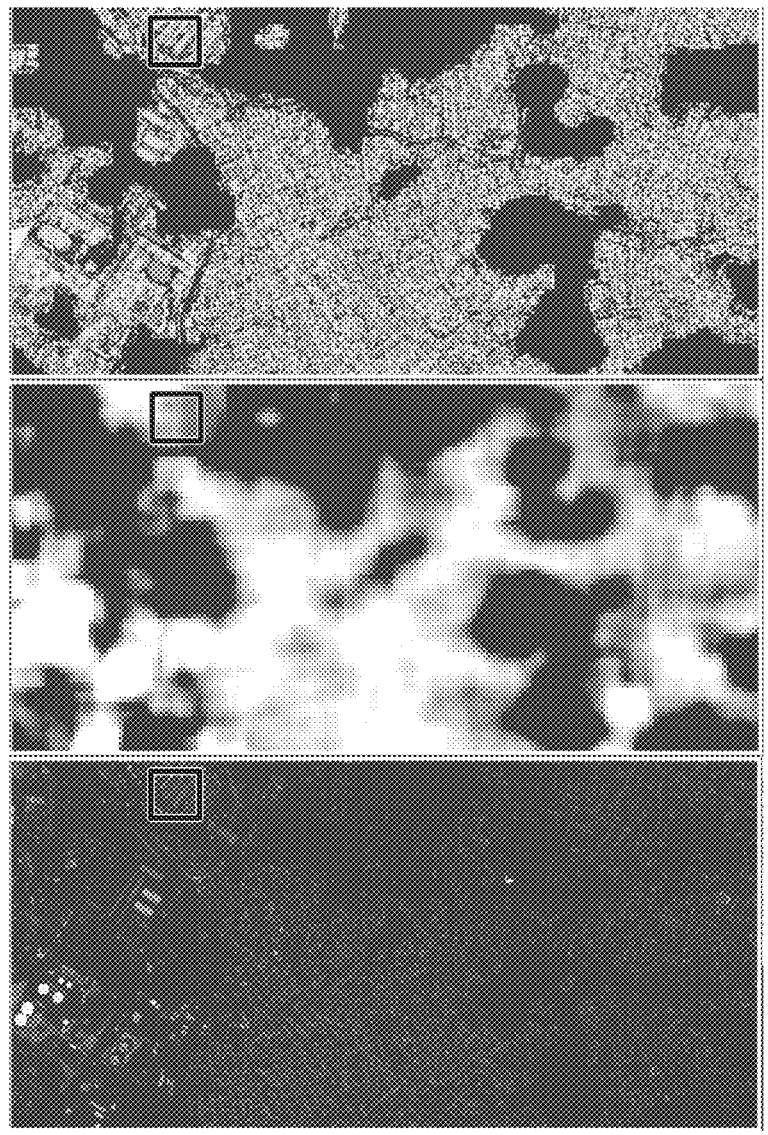

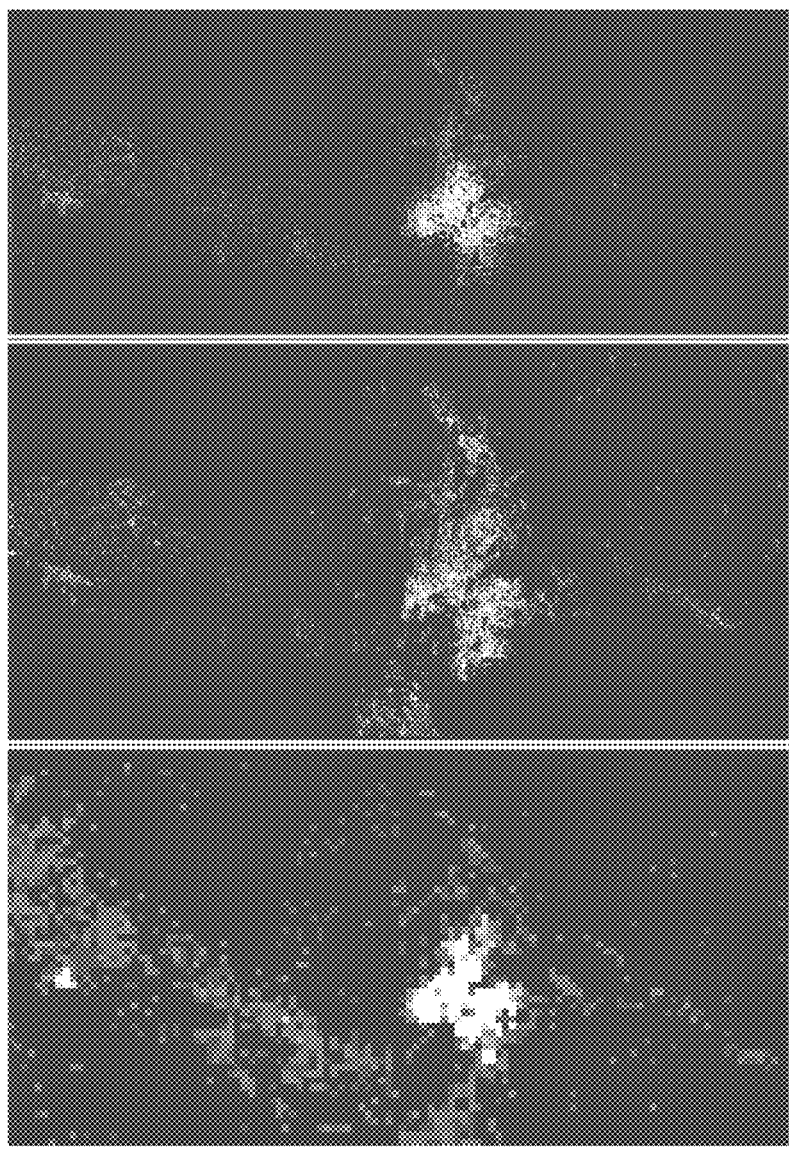

GENERATION OF HIGH RESOLUTION POPULATION DENSITY DATA SETS THROUGH EXPLOITATION OF HIGH RESOLUTION OVERHEAD IMAGERY DATA AND LOW RESOLUTION POPULATION DENSITY DATA SETS

RELATED APPLICATIONS

This application is a divisional of U.S. patent application Ser. No. 14/063,309, filed Oct. 25, 2013, and entitled "GENERATION OF HIGH RESOLUTION POPULATION DENSITY DATA SETS THROUGH EXPLOITATION OF HIGH RESOLUTION OVERHEAD IMAGERY DATA AND LOW RESOLUTION POPULATION DENSITY DATA SETS," which claims priority to U.S. Provisional Patent Application No. 61/871,691, filed Aug. 29, 2013, and entitled "GENERATION OF HIGH RESOLUTION POPULATION DENSITY DATA SETS THROUGH EXPLOITATION OF HIGH RESOLUTION OVERHEAD IMAGERY DATA AND LOW RESOLUTION POPULATION DENSITY DATA SETS," the entire contents of which are incorporated herein by reference in their entireties as if set forth in full.

BACKGROUND

Information on human settlements is crucial for a wide range of applications including emergency response, disaster risk reduction, population estimation/analysis, and urban/regional planning. Urbanization pressure generates environmental impacts, indicates population growth, and relates to risk and disaster vulnerability. For instance, the global population passed the mark of 7.0 billion in 2011 with more than half of the population living in urban areas. Between 2011 and 2050, the urban population is expected to increase by about 2.7 billion, passing from 3.6 billion in 2011 to 6.3 billion in 2050. The population growth in urban areas is projected to be concentrated in the cities and towns of the less developed countries and continents. Asia, in particular, is projected to see its urban population increase by 1.4 billion, Africa by 0.9 billion, and Latin America and the Caribbean by 0.2 billion.

Population growth is therefore becoming largely an urban phenomenon concentrated in the developing world resulting in major challenges to manage the urban development in a sustainable manner. One issue in this respect is the availability of up-to-date information on the extent and quality of the urban settlement (e.g., the urban "built-up" or "build-up," such as man-made 3-dimensional structures) which is largely unavailable in developing countries. For instance, cities are often growing at a pace that cannot be fully controlled by the local or regional mapping agencies. As demographic pressure increases exponentially at a global level, the ability to monitor, quantify and characterize urbanization processes around the world is becoming paramount. The information about the quality of urban development can provide precious input for understanding the vulnerability of the population living on our planet.

While overhead imagery could provide information about the world-wide built-up environment, there are few global data sets available that could be used to map the human settlements. Examples include the night-time lights of the world based on the Defense Meteorological Satellite Program—Operational Linescan System (DMSP-OLS) sensor, Moderate Resolution Imaging Spectroradiometer (MODIS) based land use/land cover classifications, and global population data sets like LandScan™ or the gridded population of the world (GPW). In the case of LandScan and GPW, for instance, available global population data sets include population density estimation cell sets at coarse resolutions of 0.00833 (approximately 1000 m) or the like (e.g., where each population density estimation cell is in the form of a square that represents 1000 m on a side and indicates a particular population density or population density range over a geographic region, city etc.). While such population density data sets may be somewhat useful in conveying general population density estimates over large areas, they are limited in their ability to provide more fine grained population density estimates. In the case of an urban area, for instance, population densities may vary widely just between adjacent street blocks.

SUMMARY

The inventor has determined that it may be useful to utilize high resolution overhead image data to obtain population density estimation data sets at resolutions higher than those currently available. In this regard, disclosed herein are utilities (e.g., systems, methods, etc.) for automatically generating high resolution population density estimation data sets through manipulation of low resolution population density estimation data sets with high resolution overhead imagery data (e.g., such as overhead imagery data acquired by satellites, aircrafts, etc. of celestial bodies). Stated differently, the present utilities make use of high resolution overhead imagery data to determine how to distribute the population density of large, low resolution cells (e.g., 1000 m) of a particular geographic region among a plurality of smaller, high resolution cells (e.g., 100 m) within the larger cells.

Broadly, one aspect disclosed herein includes identifying areas of built-up structures in at least one input overhead image of a geographic region, obtaining population density estimates of a plurality of first portions (e.g., larger, low resolution cells) of the geographic region, and using information related to the areas of built-up structures in the at least one input overhead image within the first portions to allocate the population density estimates across a plurality of second portions (e.g., smaller, high resolution cells) of the geographic region.

For example, a low abstraction information layer, in which image descriptors corresponding to the built-up extent are organized into homogeneous regions, may be extracted from any appropriate high resolution (e.g., HR, VHR, etc.) overhead image data (e.g., multispectral, panchromatic, red-green-blue (RGB), etc.) of the particular geographic area (e.g., city, region, etc.). In one arrangement, the low abstraction information layer may be in the form of a plurality of multi-scale morphological image descriptors for each of a respective plurality of pixels of at least one input overhead image of the geographic area or region (e.g., at a spatial resolution of 2 m or the like). For instance, the low abstraction information layer may be in the form of a non-linear mixture model such as the Characteristic-Saliency-Level or CSL model which may be obtained from a Differential Area Profile (DAP) vector field (VF) generated from the overhead image data.

The step of using the areas of built-up structures in the at least one input overhead image within each of the first portions (the larger, low resolution cells) to allocate the population density estimates across a plurality of second portions (the smaller, high resolution cells) within the first portions may include obtaining the plurality of multi-scale morphological image descriptors for each of a respective plurality of pixels of the areas of built-up structures in the at least one input overhead image of the geographic region, training a linear model with the plurality of population density estimates of the plurality of first portions and the multi-scale morphological image descriptors within each of the plurality of first portions to obtain a plurality of respective weighting factors (e.g., collectively, a weighting vector), and using the weighting factors to allocate the population density estimate of the first portions across the plurality of second portions.

For instance, the training step may include decomposing the multi-scale morphological image descriptors within each of the first portions into a respective plurality of first vectors that each include a plurality of entries (e.g., where each entry includes a value that represents a frequency of one of a plurality of fixed values of the multi-scale morphological image descriptors within a respective one of the first portions) and combining the plurality of first vectors into a matrix. The training step may also include generating a second vector that includes a plurality of entries (e.g., where each entry includes a value that represents one of the population density estimates of a respective one of the plurality of first portions of the geographic region). The linear model may represent a difference between the second vector and a product of the matrix and a third vector that includes a plurality of entries. The training step may thus include determining a particular plurality of values of the respective plurality of entries of the third vector that minimizes the difference, where the particular plurality of values is the plurality of weighting factors.

Once the weighting factors have been obtained, the method may utilize the weighting factors to determine population density estimates for the plurality of second portions (e.g., the smaller, high resolution cells) of the geographic area. In this regard, the method may include, for each second portion, decomposing the multi-scale morphological image descriptors within the second portion into a fourth vector that includes a plurality of entries (e.g., where each entry includes a value that represents a frequency of one of the plurality of fixed values of the multi-scale morphological image descriptors within the second portion), and manipulating the fourth vector with the weighting vector to obtain the population density estimate for the second portion. For instance, the manipulating step may include obtaining an inner product of the fourth vector and the weighting vector, and multiplying the inner product by a total quantity of pixels in the second portion of the at least one overhead image to obtain the population density estimate for the second portion. The plurality of population density estimates of the respective plurality of second portions may be mapped into a resultant image of the geographic region.

In one arrangement, population density estimates in the small, high resolution cells may be reallocated and/or otherwise constrained so that the geographic scope of the estimates more closely correspond with those of the larger, low resolution cells. As an example, it may be the case that a geographic scope of the relatively higher population density portions in the higher resolution cells is greater (e.g., extends farther outward) than that in the corresponding lower resolution cells. For instance, the method may include using the population density estimate of the first portion to constrain the population density estimates of the second portions of the first portion, such as by normalizing the population density estimates of the second portions into a plurality of normalized population density estimates, and multiplying the population density estimate of the first portion by the normalized population density estimates to obtain corrected population density estimates for the second portions.

In another aspect, a system for generating high resolution population density estimation cells of a geographic region from low resolution population density estimation cells and high resolution overhead imagery of the geographic region includes a training engine, executable by a processor, that trains a linear model to obtain a plurality of weighting factors to be used for determining population density estimates of a plurality of high resolution cells within a plurality of low resolution cells of a geographic area. The linear model includes a) a respective plurality of population density estimates of the plurality of low resolution cells and b) a plurality of multi-scale morphological image descriptors of a respective plurality of pixels of at least one input overhead image of the geographic region within each of the plurality of low resolution cells. The system also includes an estimation engine, executable by the processor, that estimates a plurality of population density estimates of the respective plurality of high resolution cells within each of the low resolution cells of the geographic region using the plurality of weighting factors and a plurality of multi-scale morphological image descriptors within each of the plurality of high resolution cells.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 4a graphically illustrates multi-scale morphological image descriptors generated from multispectral imagery acquired by the WorldView 2 satellite over a portion of the city of Kabul, Afghanistan in 2012.

FIG. 4b illustrates low resolution population density estimation cells over the portion of the city of Kabul, Afghanistan in 2012 of FIG. 4a.

FIG. 5a illustrates multispectral imagery acquired by the WorldView 2 satellite over a portion of the city of Kabul, Afghanistan in 2012.

FIG. 5b illustrates multi-scale morphological image descriptors generated from the multispectral imagery of FIG. 5a.

FIG. 5c is a mask for use in automatically removing the image descriptors of non-built-up portions from FIG. 5b.

FIG. 6a presents an image of a portion of Kabul, Afghanistan that graphically depicts low resolution population density estimation cells.

FIG. 6b presents another image of the same portion of Kabul, Afghanistan as in FIGS. 6b, but that graphically depicts high resolution population density estimation cells generated using the automated high resolution population density estimation system of FIG. 2.

FIG. 6c presents another image similar to that in FIG. 6b, but where a geographic scope of the high resolution population density estimate cells has been constrained using the geographic scope of corresponding low resolution population density estimation cells of FIG. 6a.

DETAILED DESCRIPTION

Figure 1:
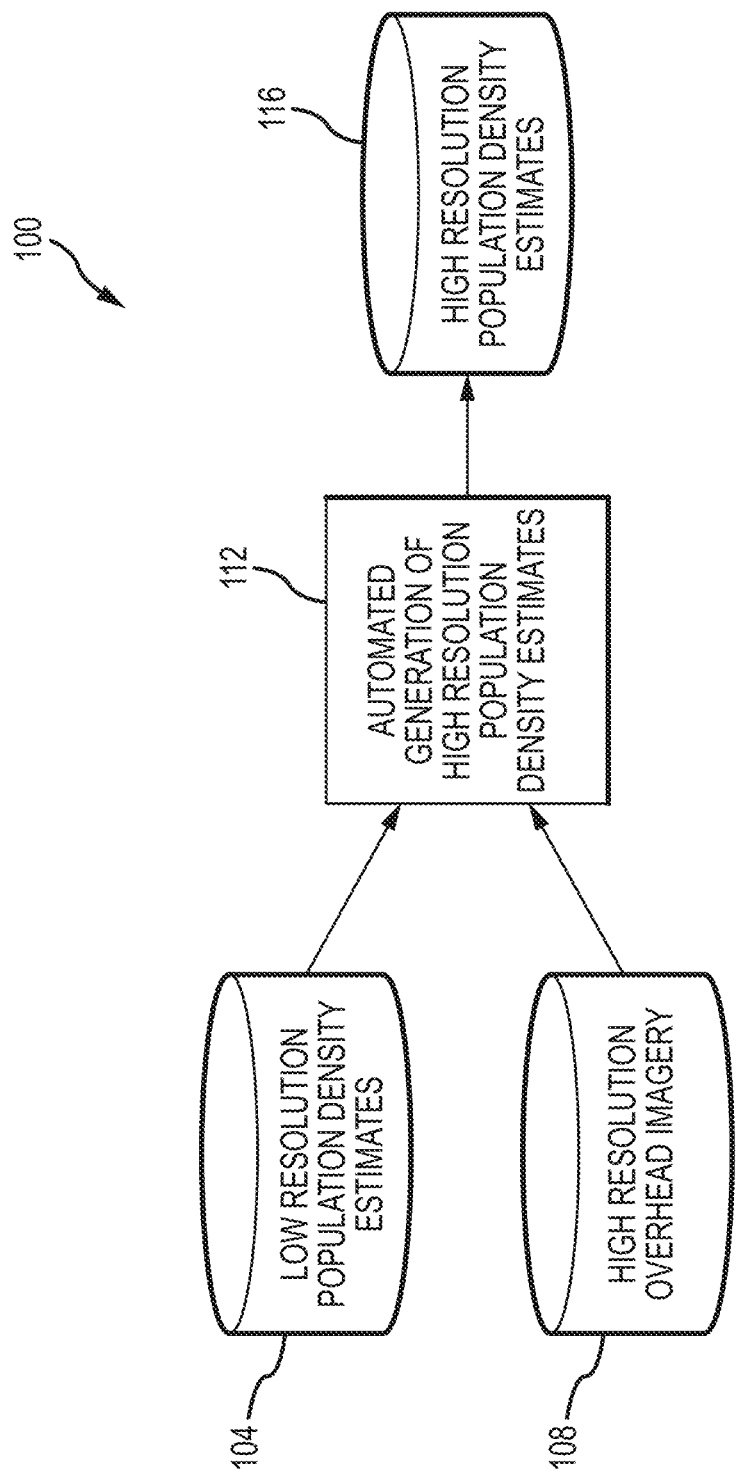
FIG. 1 is a simplified block diagram illustrating a process of generating high resolution population density estimation data from high resolution overhead imagery and low resolution population density estimation data.

Disclosed herein are utilities (e.g., systems, processes, etc.) for efficiently and automatically generating high resolution population density estimate data sets of a geographic area using known low resolution population density estimate data sets of the geographic area and high resolution overhead imagery of the geographic area. Initially, a linear model between population density estimates of a plurality of low resolution cells (e.g., 1000 m) over the geographic area and a matrix of histograms (e.g., vectors) of image descriptors (e.g., multi-scale morphological image descriptors) within each of the low resolution cells may be trained to obtain a plurality of weighting factors or values. Histograms (e.g., vectors) of image descriptors ascertained in each of a plurality of high resolution cells (e.g., 100 m) over the geographic area may then be appropriately manipulated with the weighting vector to obtain population density estimates for each of the high resolution cells.

At the outset, it is noted that, when referring to the earth herein, reference is made to any celestial body of which it may be desirable to acquire images or other remote sensing information. Furthermore, when referring to "overhead" imagery herein, such imagery may be obtained by any spacecraft, satellite, aircraft, and/or the like capable of acquiring images or other remote sensing information. Furthermore, the utilities described herein may also be applied to other imaging systems, including imaging systems located on the earth or in space that acquire images of other celestial bodies. It is also noted that the drawing figures contained herein are not necessarily drawn to scale and that such figures have been provided for the purposes of discussion and illustration only.

Generally, high resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like. In the case of a consumer digital camera, as one non-limiting example, an image sensor is generally arranged in an area array (e.g., 3,000 rows of 3,000 pixels each, or 9,000,000 total pixels) which collects the image area in a single "snapshot." In the case of satellite-based imaging, as another non-limiting example, the "pushbroom scanning" principle is sometimes employed whereby each image sensor includes a relatively small number of rows (e.g., a couple) of a great number of pixels (e.g., 50,000 or more) in each row. Each row of pixels may be scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of overhead images varies depending on factors such as the particular instrumentation utilized, the altitude of the satellite's (or other aircraft's) orbit, and the like.

Image collection platforms (e.g., aircraft, earth-orbiting satellites, etc.) may collect or acquire various types of imagery in one or more manners. As one non-limiting example, image collection platforms may perform panchromatic collection of scenes of a celestial body which generally refers to the collection of image data across a single broad range of wavelengths (e.g., all visible light, from near infrared (NIR) to near ultraviolet (NUV), etc.). As another non-limiting example, image collection platforms may additionally or alternatively capture image data within the visible light band and include respective filters to separate the incoming light into red, green and blue portions. As a further non-limiting example, image collections platforms may additionally or alternatively perform multispectral collection of scenes of a celestial body which generally refers to the collection of image data at multiple specific spectral bands across the electromagnetic spectrum (e.g., within bands both inside and outside of the visible light range such as NIR, short wave infrared (SWIR), far infrared (FIR), etc.). For instance, a satellite may have one image sensor that is sensitive to electromagnetic radiation across only a first spectral band (e.g., the visible light band, such as a wavelength range of about 380-750 nm) in addition to one or more additional image sensors that are sensitive to electromagnetic radiation only across other spectral bands (e.g., NIR, 750-1400 nm; SWIR, 1400-3000 nm; etc.). Multispectral imaging may allow for the extraction of additional information from the radiance received at a satellite after being reflected from the Earth's surface (which may include atmospheric effects such as from aerosols, clouds, etc.).

As discussed previously, there are generally few global data sets available that could be used to map the human settlements. In the case of LandScan and GPW, for instance, available global population data sets include population density estimation cell sets at coarse resolutions of 1000 m or the like (e.g., where each population density estimation cell is in the form of a square that represents 1000 m on a side). While such population density data sets may be somewhat useful in conveying general population density estimates over large areas, they are limited in their ability to provide more fine grained population density estimates. In the case of an urban area, for instance, population densities may vary widely just between adjacent street blocks. In this regard, it may be useful to utilize high resolution overhead image data to obtain population density estimation data sets at resolutions higher than those currently available.

In this regard, FIG. 1 presents a simplified block diagram of a system 100 that may be used to generate and map high resolution population density estimation data sets of a geographic area or region using known low resolution population density estimation data sets of the geographic area (e.g., LandScan population density data) in addition to any appropriate pixel image descriptors (e.g., characteristic, saliency, brightness, pixel intensity, grayscale value, etc.) of built-up areas (e.g., houses, buildings, tents, and/or other man-made 3-dimensional structures) obtained from any appropriate HR/VHR overhead imagery (e.g., <1-10 m spatial resolution overhead image data obtained by a number of heterogeneous platforms such as SPOT 2 and 5, CBERS 2B, RapidEye 2 and 4, IKONOS® 2, QuickBird 2, WorldView 1, 2, and/or 3). Initially, the system 100 obtains low resolution population density estimates 104 (e.g., made up of a grid of 1000 $m^2$ population density cells, etc.) over a particular geographic area (e.g., city, region, etc.) and any appropriate image descriptors identifying built-up areas from HR/VHR overhead imagery data 108 of the geographic area. The system 100 then performs the automated generation 112 of high resolution population density estimates from the previously obtained data 104, 108 to obtain high resolution population density estimates 116 (e.g., made up of a grid of cells having areas smaller than those of the low resolution population density cells, such as 100 $m^2$ population density cells, 10 $m^2$ population density cells, etc.) over the geographic area.

Figure 2:
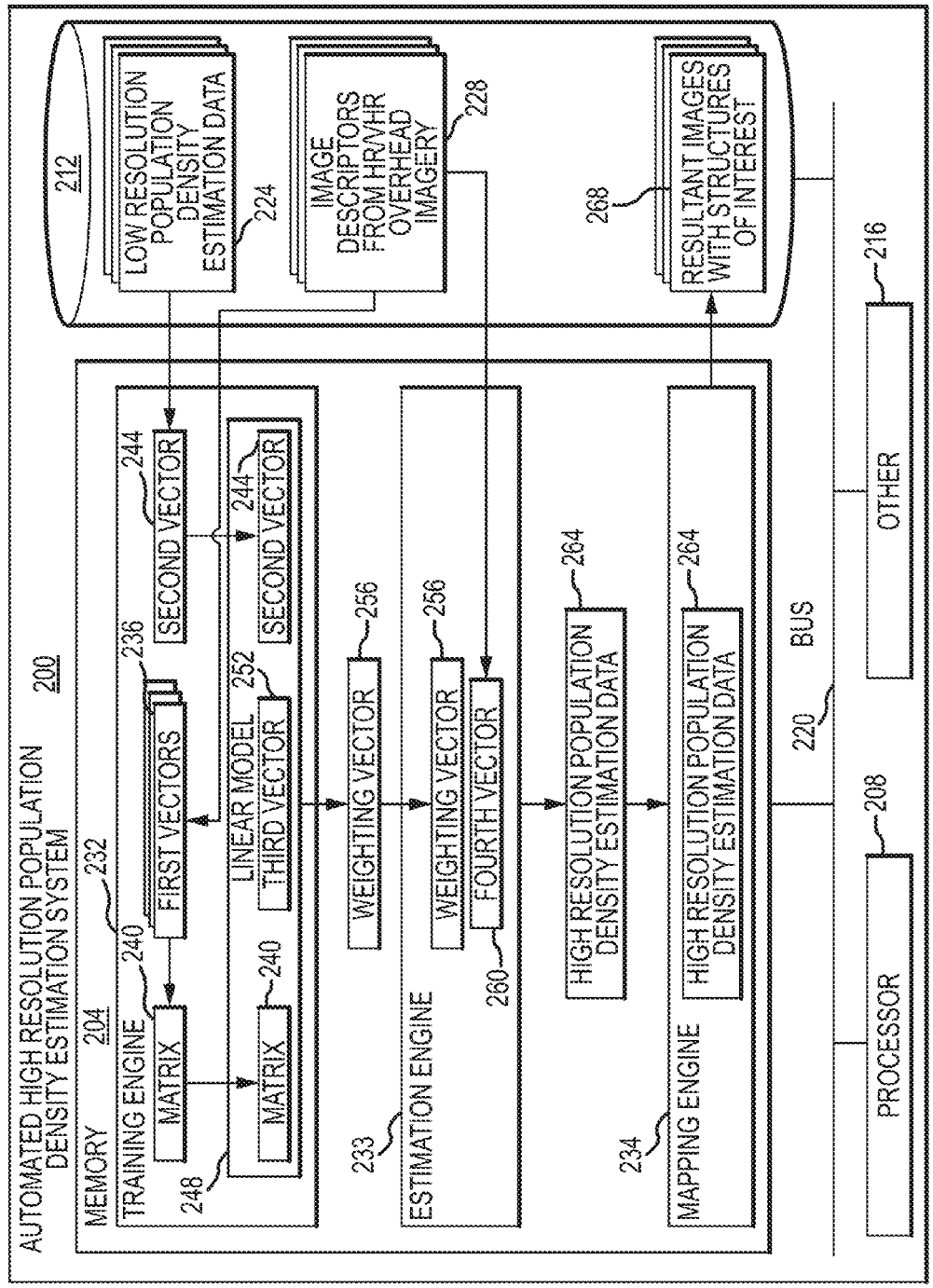
FIG. 2 is a block diagram of an automated high resolution population density estimation system according to one embodiment.

FIG. 2 presents a block diagram of an automated high resolution population density estimation system 200 that may be used to implement the automated generation 112 of high resolution population density estimation data sets (e.g., made up of a plurality of high resolution cells) shown in FIG. 1. Although depicted as a single device (e.g., server, workstation, laptop, desktop, mobile device, and/or other computing device), one or more functionalities, processes or modules of the system 200 may be allocated or divided among a plurality of machines, devices and/or processes which may or may not be embodied in a single housing. In one arrangement, functionalities of the server 200 may be embodied in any appropriate cloud or distributed computing environment.

Broadly, the system 200 may include memory 204 (e.g., one or more RAM or other volatile memory modules, etc.), a processing engine or unit 208 (e.g., one or more CPUs, processors, processor cores, or other similar pieces of hardware) for executing computer readable instructions from the memory 204, storage 212 (e.g., one or more magnetic disks or other non-volatile memory modules or non-transitory computer-readable mediums), and/or a number of other components 216 (e.g., input devices such as a keyboard and mouse, output devices such as a display and speakers, and the like), all of which may be appropriately interconnected by one or more buses 220. While not shown, the system 200 may include any appropriate number and arrangement of interfaces that facilitate interconnection between the one or more buses 220 and the various components of the system 200 as well as with other devices (e.g., network interfaces to allow for communication between the system 200 and other devices over one or more networks, such as LANs, WANs, the Internet, etc.).

The system 200 may retrieve any appropriate low resolution population density estimation data 224 of a particular geographic region (e.g., LandScan population density kilometric cells) as well as any appropriate image descriptors 228 of pixels corresponding to built-up in HR/VHR overhead imagery of the geographic region (e.g., as well as the HR/VHR imagery itself) and store the same in any appropriate form in storage 212 (e.g., such as in one or more databases and manageable by any appropriate database management system (DBMS) to allow the definition, creation, querying, update, and administration of the databases). The processing engine 208 may execute a DBMS or the like to retrieve and load the low resolution population density estimation data 224 and the image descriptors 228 into the memory 204 for manipulation by a number of engines or modules of the system 200 that are discussed in more detail below.

As shown, the system 200 may include a "training" engine 232 that is broadly configured to generate a weighting vector 236 of weighting values from the low resolution population density estimation data 224 and the image descriptors 228, an "estimation" engine 233 that is broadly configured to utilize the weighting vector 236 to estimate population density estimates for high resolution cells 244 of the geographic area, and a "mapping" engine 234 that is broadly configured to map the high resolution population density estimation cells 244 into one or more resultant images 252 of the geographic area.

Each of the engines (and/or other engines, modules, logic, etc.) disclosed and/or encompassed herein may be in the form of one or more sets of computer-readable instructions for execution by the processing unit 208 and that may be manipulated by users in any appropriate manner to perform the automated generation of high resolution population density estimation cells and presentation thereof on a display (not shown). In this regard, the combination of the processor 208, memory 204, and/or storage 212 (i.e., machine/hardware components) on the one hand and the various engines/modules disclosed herein in one embodiment create a new machine that becomes a special purpose computer once it is programmed to perform particular functions of the high resolution population density estimation utilities disclosed herein (e.g., pursuant to instructions from program software). In one arrangement, any appropriate portal in communication with the various engines may run on the system 200 and be accessible by users (e.g., via any appropriate browser) to access the functionalities of the system 200. While the various engines have been depicted in FIG. 2 as being separate or distinct modules, it is to be understood that the functionalities or instructions of two or more of the engines may actually be integrated as part of the same computer-readable instruction set and that the engines have been depicted in the manner shown in FIG. 2 merely to highlight various functionalities of the system 200. Furthermore, while the engines have been illustrated as being resident within the (e.g., volatile) memory 204 (e.g., for execution by the processing engine 208), it is to be understood that the engines may be stored in (e.g., non-volatile) storage 212 (and/or other non-volatile storage in communication with the system 200) and loaded into the memory 204 as appropriate.

Figure 3:
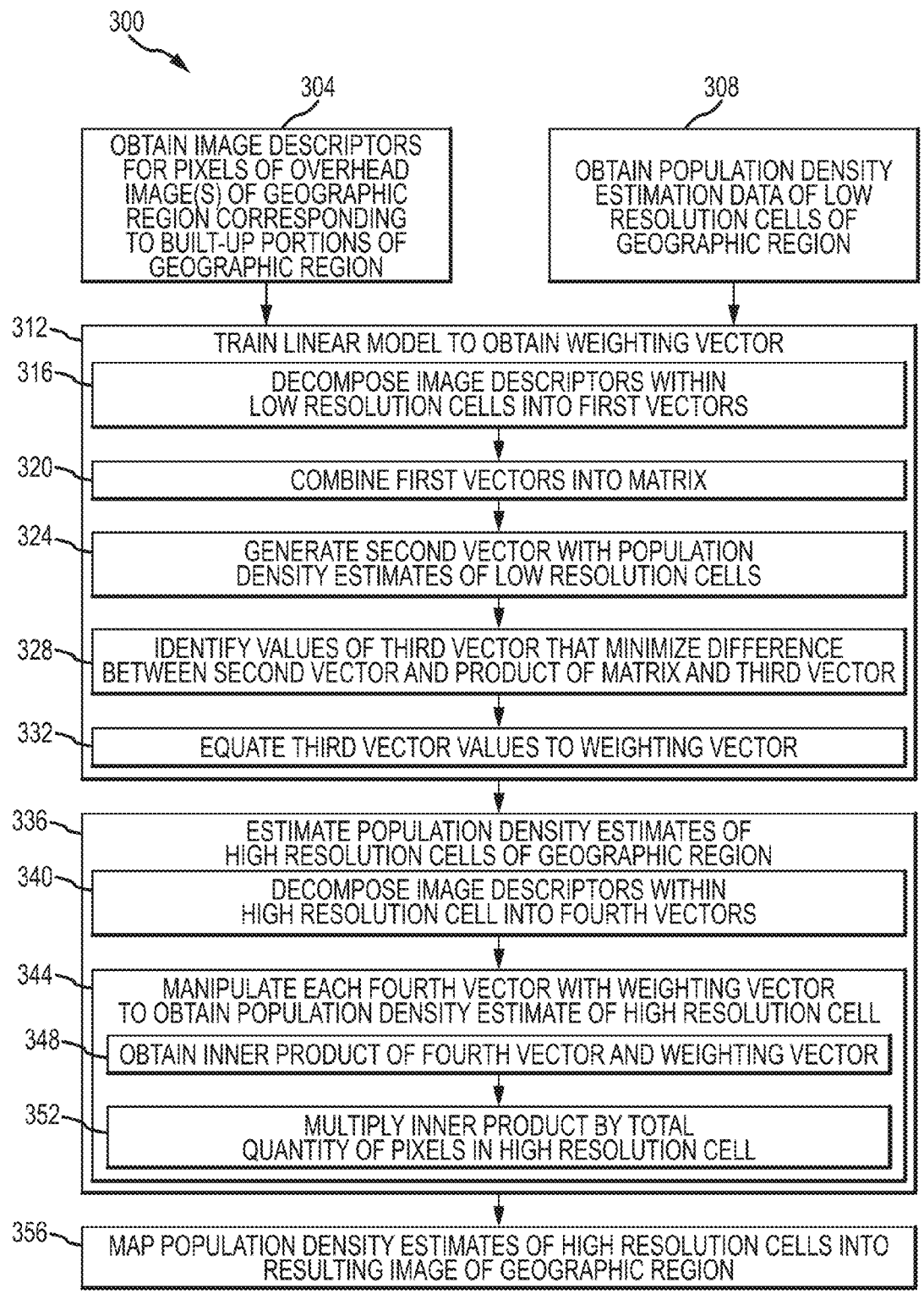
FIG. 3 is a flow diagram of a method for generating high resolution population density estimation data from high resolution overhead imagery and low resolution population density estimation data.

To facilitate the reader's understanding of the various engines of the system 200, additional reference is now made to FIG. 3 which illustrates a method 300 for use in performing the high resolution population density estimation utilities disclosed herein. While specific steps (and orders of steps) of the method 300 have been illustrated and will be discussed, other methods (including more, fewer or different steps than those illustrated) consistent with the teachings presented herein are also envisioned and encompassed within the present disclosure.

The method 300 may begin by obtaining 304 image descriptors (e.g., multi-scale morphological image descriptors) of pixels of at least one overhead image of a geographic area or region that correspond with built-up portions of the geographic area in addition to obtaining 308 low resolution population density estimate data for the geographic area. In one arrangement, a low abstraction information layer in which image elements corresponding to the built-up extent may be organized into homogeneous regions may be extracted from HR/VHR overhead image data (e.g., multi-spectral, panchromatic, red-green-blue (RGB), etc.) of the particular geographic area (e.g., city, region, etc.).

As just one example, the low abstraction information layer may be in the form of a non-linear mixture model such as the Characteristic-Saliency-Level or CSL model which may be obtained from a Differential Area Profile (DAP) vector field (VF) generated from the overhead image data. For instance, the overhead image data (e.g., 2 m spatial resolution or the like) may be organized into a plurality of hierarchically arranged, connected components of a hierarchical data structure, such as a rooted, uni-directed tree with its leaves corresponding to a regional maxima of the input image(s) and its root corresponding to a single connected component defining the background of the input image(s). At least one morphological attribute filter (e.g., an edge preserving operator) may then progressively accept (or reject) connected components of the tree based on some attribute criterion. For instance, attribute openings and attribute closings may be used whereby the intensity value (e.g., grayscale) of each connected component is assessed at each of a number of progressively increasing and decreasing predetermined intensity levels and the component is rejected if the intensity value is not higher or lower than each respective progressively increasing or decreasing predetermined intensity level. For each pixel in the image, positive and negative response vectors may be generated each having a number of entries respectively including the intensity difference (e.g., contrast) between connected components within which the pixel is disposed at each respective predetermined intensity level. The positive and negative response vectors may be concatenated into a DAP (e.g., non-linear spatial signature) for each pixel and the DAPs of all pixels may form the DAP VF.

The largest entry in the DAP for each pixel may be a "saliency" (S) multi-scale morphological image descriptor which may encode the areas of bright features (e.g., linked to built-up on a statistical basis) and dark features (e.g., linked to shadow sizes which provide an indication of built-up height) which collectively contain information about built-up volume. The minimum scale at which the largest entry occurred may be a "characteristic" (C) multi-scale morphological image descriptor. The highest peak component level from which S was determined may be a "level" (L) multi-scale morphological image descriptor. In one arrangement, the extracted built-up extent may be used as a mask to retain only those portions of the low or medium abstraction information (e.g., semantic) layer corresponding to the built-up.

FIG. 4a presents a graphical representation (e.g., as may be presented on any appropriate display or monitor in communication with the system 200 of FIG. 2) of multi-scale morphological image descriptors (e.g., a fusion of the C and S descriptors discussed previously) of pixels of built-up areas generated from multispectral imagery acquired by the WorldView 2 satellite over a portion of Kabul, Afghanistan (where the black areas devoid of image descriptors depict non-built-up portions of Kabul). In this figure, a Hue-Saturation-Value (HSV) transform/logic has been used to produce a color output whereby hue (e.g., color and/or shade) has been mapped to the S layer, saturation is constant, and value has been mapped to the C layer. For instance, the particular hue (e.g., which corresponds to the S layer) of a pixel may convey the area of a built-up structure (e.g., between 100 $m^2$-300 $m^2$, between 300 $m^2$-600 $m^2$, etc.), the particular value (e.g., which corresponds to the C layer) of a pixel may convey the confidence in the built-up structure (e.g., where a higher contrast may indicate a greater confidence about a structure corresponding to either a building or a shadow), and/or the like.

FIG. 4b illustrates low resolution population density estimation cells 400 (e.g., 1000 $m^2$ cells) corresponding to the portion of Kabul, Afghanistan of FIG. 4a. For instance, a first low resolution cell 404 of FIG. 4b may be used to isolate and extract the CS values (e.g., and/or other morphological image descriptors) from FIG. 4a within the geographic scope of the first low resolution cell 404 for reasons that will be discussed in more detail below. Other ones of the low resolution cells 400 may be similarly used to isolate CS values corresponding to such other low resolution cells 400. In this example, each of the low resolution cells 400 has been differently shaded to convey a different population density estimate for each of the cells (e.g., where the first shade of first low resolution cell 404 indicates a population density estimate of 500, the second shade of second low resolution cell 408 indicates a population density estimate of 250, and/or the like). Of course, other manners of depicting population density estimates of the low resolution cells 400 are also envisioned and encompassed herein (e.g., color, saturation, etc.).

As discussed above, the pixel image descriptors (e.g., multi-scale morphological image descriptors) obtained at 304 in the method 300 are those that represent built-up areas of the geographic area (e.g., as opposed to those not representing built-up areas of the geographic area, such as those areas illustrated in all black in FIG. 4a). In one arrangement, the built-up extent and/or other structures of interest (e.g., buildings, houses, shelters, tents, etc.) may be extracted from or otherwise identified in any appropriate manner from HR/VHR overhead image data (e.g., multispectral, panchromatic, red-green-blue (RGB), etc.) of the geographic area (e.g., images different than or the same as that/those from which the CS values and/or other pixel image descriptors were extracted) by way of the classification of texture parameters in the overhead image data and used (e.g., as a mask) to only isolate those CS values and/or other pixel image descriptors corresponding to the built-up extent. For instance, one manner of extracting built-up from high resolution overhead imagery is disclosed in U.S. patent application Ser. No. 13/955,268 and entitled "Automatic Generation of Built-up Layers from High Resolution Satellite Image Data," which has been incorporated herein by reference in its entirety. Another manner of extracting built-up from high resolution overhead imagery is disclosed in U.S. patent application Ser. No. 14/013,904 and entitled "Automatic Extraction of Built-Up Footprints from High Resolution Overhead Imagery through Manipulation of Alpha-Tree Data Structures," which has been incorporated herein by reference in its entirety. However, other manners of extracting built-up are encompassed within the scope of the present disclosure.

In one arrangement, the CS and/or other image descriptor values may be extracted from HR/VHR overhead imagery (e.g., one or more input images) at a first spatial resolution (e.g., 2 m) while the built-up extent for use in isolating the CS and/or other image descriptor values corresponding to the built-up extent may be extracted from HR/VHR overhead imagery (e.g., one or more input images) at a second spatial resolution (e.g., 10 m) that is less than the first spatial resolution (e.g., 2 m). As used here, one spatial resolution being "less than" another spatial resolution means that the one spatial resolution is of a larger numerical value than the other spatial resolution, and vice versa. For instance, FIG. 5a illustrates multispectral imagery acquired by the WorldView 2 satellite over a portion of Kabul, Afghanistan, FIG. 5b illustrates multi-scale morphological image descriptors (e.g., a CS layer) of the built-up extent of the portion of Kabul, Afghanistan generated from the multispectral imagery of FIG. 5a, and FIG. 5c is a mask for use in automatically removing those portions of the CS layer in FIG. 5b corresponding to non-built-up portions.

Once the image descriptors of the built-up extent have been obtained 304 and the population density estimates of the low resolution cells have been obtained 308 for the particular geographic area, the method 300 may proceed to training 312 a linear model to obtain a weighting vector to be used for estimating population densities for a plurality of smaller, high resolution cells over the geographic region. For instance, the training engine 232 of the system 200 (see FIG. 2) may obtain a plurality of image descriptors 228 of the built-up extent of a particular geographic area (e.g., the CS values represented by the pink and green colors in FIG. 4a) as well as population density data 224 for a plurality of low resolution cells over the geographic area (e.g., those in FIG. 4b). Thereafter, the training engine 232 may decompose 316 the image descriptors corresponding to built-up within each of the low resolution cells into a respective plurality of first histograms or vectors 236, where each vector generally conveys the frequency of each of a plurality of image descriptor values within the respective low resolution cell.

For example, each of the various values of the image descriptors of the various pixels within the low resolution cells (e.g., where each pixel associated with built-up includes a value representing a fusion of its respective C and S values of FIG. 4a) may be initially resolved into one of a number of fixed and/or normalized values, such as one of 255 values (e.g., the maximum number representable by an eight-bit number) and/or the like. For example, if the range of the CS fusion values within the low resolution cells in the geographic area or region spanned from 0.1 to 10, then a fixed value 1 could be associated with CS fusion value 0, a fixed value 2 could be associated with CS fusion value 0.03, a fixed value 3 could be associated with CS fusion value 0.06, and so on. For each pixel, the training engine 232 may thus obtain its respective CS fusion value (or other image descriptor value), identify a closest CS fusion value having a respective fixed value, and assign the fixed value to the pixel.

Thereafter, a histogram including the frequencies of each of the fixed values within each of the low resolution cells may be expressed in the form of the following vector for each low resolution cell:

$$x_i = [a_1(b_1), a_2(b_2), \ldots a_n(b_n)],$$

where each of the entries $a_1(b_1)$, $a_2(b_2)$, etc. corresponds to the frequency of a particular one of a plurality of fixed values $b_1$, $b_2$, etc. among all the pixels of the built-up in the particular low resolution cell.

Assuming for purposes of simplicity that the pixel image descriptors were resolved into three fixed values 1, 2 and 3, a vector $x_1=[0.20, 0.45, 0.35]$ would indicate that 20% of the built-up pixels in a first low resolution cell (e.g., first low resolution cell 404 in FIG. 4a) had one or more image descriptors resolved into fixed value 1, 45% of the built-up pixels in a first low resolution cell had one or more image descriptors resolved into fixed value 2, and 35% of the built-up pixels in a first low resolution cell had one or more image descriptors resolved into fixed value 3. First vectors may be similarly determined for each of the other low resolution cells of the particular geographic area.

The training engine 232 may then appropriately combine 320 the plurality of first vectors 236 (e.g., $x_1$, $x_2$, $x_3$, etc.) respectively corresponding to each of the plurality of low resolution cells (e.g., low resolution cells 400 in FIGS. 4a-4b) into a matrix 240 (e.g., matrix "x") as follows:

$$x = \begin{bmatrix} a_1(b_1(x_1)) & a_2(b_2(x_1)) & \ldots & a_n(b_n(x_1)) \\ a_1(b_1(x_2)) & a_2(b_2(x_2)) & \cdots & a_n(b_n(x_2)) \\ a_1(b_1(x_3)) & a_2(b_2(x_3)) & \cdots & a_n(b_n(x_3)) \end{bmatrix},$$

where each row of the matrix x includes the first vector of a different respective low resolution cell of the geographic region.

As shown in FIGS. 2 and 3, the training engine 232 may also obtain or generate 324 a second vector 244 (e.g., vector "y") including a plurality of entries, where each entry includes the known population density estimate of a respective one of the plurality of low resolution cells as follows:

$$y=[y_1, y_2 \ldots y_n],$$

and where each of the entries $y_1$, $y_2$, etc. corresponds to the population density estimate of a particular one of the low resolution cells (e.g., as obtained from LandScan data or the like).

The training engine 232 may then generate a linear model 248 that includes the matrix 240 (e.g., matrix 4 the second vector 244 (e.g., vector y), and a third vector 252 for purposes of identifying a particular plurality of weighting factors (collectively, a weighting vector 256) that may be used to estimate population densities for a plurality of smaller high resolution cells over the geographic area. See FIG. 2. More specifically, and with reference to FIGS. 2 and 3, the method 300 may include identifying 328 a plurality of values of the third vector 252 that minimizes a difference between a) the second vector 244 and b) a product of the matrix 240 and the third vector 252, and then equating 332 the particular plurality of values of the third vector 252 that minimizes the above difference to the weighting vector 256 of weighting factors. For instance, the third vector 252 may be expressed as follows:

$$w=[w_1(b_1), \ldots w_2(b_2), \ldots w_n(b_n)],$$

where each of the entries $w_1(b_1)$, $w_2(b_2)$, etc. corresponds to a yet to be determined weighting value or factor corresponding to a respective one of the fixed values $b_1$, $b_2$, etc.

In this regard, the linear model 248 may be expressed as follows:

$$\begin{bmatrix} w_1(b_1) \\ w_2(b_2) \\ \vdots \\ w_n(b_n) \end{bmatrix} \times \begin{bmatrix} a_1(b_1(x_1)) & a_2(b_2(x_1)) & \ldots & a_n(b_n(x_1)) \\ a_1(b_1(x_2)) & a_2(b_2(x_2)) & \cdots & a_n(b_n(x_2)) \\ a_1(b_1(x_3)) & a_2(b_2(x_3)) & \cdots & a_n(b_n(x_3)) \end{bmatrix} = \begin{bmatrix} y_1 \\ y_2 \\ \vdots \\ y_n \end{bmatrix} \sim 0,$$

Stated differently, multiplication of the vector w (e.g., third vector 252) and the matrix x (e.g., matrix 240) results in a vector "z" (not shown) that, when the vector y (e.g., second vector 244) is subtracted from vector z, results in a number substantially as close to zero as possible. In the above linear model 248, all the values of the entries in the matrix x and vector y are previously determined and/or otherwise obtained as discussed previously. In this regard, the training engine 232 seeks to optimize the linear model 248 by determining the particular plurality of values of the entries $w_1(b_1)$, $w_2(b_2)$, etc. of the vector w that limits the difference between the vector z and the vector y. The values of the vector w may be constrained to be positive during the identifying step 328 (e.g., to substantially ensure that each weighting factor connotes an average number of people leaving in a pixel corresponding to a certain CS value). It is noted that the term "third vector" is used herein connote a vector of entries whose values are as yet unknown while the term "weighting vector" is used herein to connote a vector including the specific entries of the third vector after training and optimization of the linear model 248 by the training engine 232 in the manner disclosed herein.

Referring to FIG. 3, the method 300 may then include estimating 336 population density estimates of a plurality of high resolution cells within the geographic region (e.g., such as that of a high resolution cell 412 in FIGS. 4a-4b having an area smaller than that of the first low resolution cell 404). More particularly, the estimation engine 234 of the system 200 may obtain the pixel image descriptors 228 and decompose 340 the image descriptors corresponding to built-up within each of the high resolution cells into a respective plurality of fourth vectors 260. For instance, each of the various pixel image descriptor values within the low resolution cells (e.g., the CS values within the high resolution cells 412 in FIGS. 4a-4b) may be initially resolved into one of a number of fixed values (e.g., as discussed previously in relation to the first vectors 236) and then a histogram including the frequencies of each of the fixed values within each of the high resolution cells 412 may be expressed as a fourth vector 260 (e.g., vector "d") for each high resolution cell 460 as follows:

$$d_i = [e_1(b_1), e_2(b_2), \ldots e_n(b_n)],$$

where each of the entries $e_1(b_1)$, $e_2(b_2)$, etc. corresponds to the frequency of a particular one of a plurality of fixed values $b_1$, $b_2$, etc. among all the pixels of the built-up in the particular high resolution cell.

For each high resolution cell 412, the estimation engine 233 may then manipulate 344 each respective fourth vector 260 (e.g., the vector a) with the weighting vector 256 to obtain a population density estimate for the high resolution cell 412. Generally, particular levels of certain ones of the pixel image descriptors are typically associated with greater numbers or magnitudes of people than are other ones of the fixed values. For instance, a first pixel having a first image descriptor value (e.g., a first CS fusion value) suggesting that the first pixel identifies a portion of a house may statistically identify or imply a greater number or magnitude of people than does a second pixel having a second image descriptor value (e.g., a second CS fusion value) suggesting that the second pixel identifies a portion of a bridge. Furthermore, and as discussed herein, each of the image descriptor values of the pixels in the cells is resolved into one of a number of fixed values $b_1$, $b_2$, etc. Accordingly, each weighting factor (e.g., $w_1(b_1)$, $w_2(b_2)$, etc.) of the weighting vector 256 generally connotes a particular magnitude of people to afford to or correlate with each of the fixed values (e.g., $b_1$, $b_2$, etc.).

Thus, by multiplying the each entry $e_1(b_1)$, $e_2(b_2)$, etc. of a particular fourth vector 260 by its respective weighting factor $w_1(b_1)$, $w_2(b_2)$, etc., summing the results, and multiplying the sum by the total quantity of pixels in the particular high resolution cell, a population density estimate for the high resolution cell may be obtained. Stated differently, the estimation engine 233 may obtain 348 an inner product (e.g., dot product) of the fourth vector 260 and the weighting vector 256 and then multiply 352 the inner product by the total quantity of pixels in the particular high resolution cell to obtain a population density estimate 264 for the high resolution cell. This process may be repeated with additional high resolution cells of the geographic area to obtain a grid of high resolution cells over the geographic area.

EXAMPLE

An extremely simplistic vector d (fourth vector 260) of a high resolution cell 412 in FIG. 4b and weighting vector are the following:

$$d = [0.2, 0.7, 0.1]$$

$$w = [6, 2, 12]$$

Obtaining the inner product of the vectors d and w results in the following sum:

$$[(0.2) \times (6)] + [(0.7) \times (2)] + [(0.1) \times (12)] = [1.2 + 1.4 + 1.2] = 3.8$$

Multiplying the sum by the total quantity of pixels in the high resolution cell in the overhead image(s) from which the image descriptors were obtained results in a population density estimate for the particular high resolution cell. For instance, in the event that the overhead image(s) from which the image descriptors were obtained had a spatial resolution of 2 m and the area of the high resolution cell was 1000 m$^2$ (100 m×100 m), the total number of pixels in the high resolution cell would be 1000/2 or 500. Thus, the population density estimate for the high resolution cell in this example is 500×3.8 or 1900 people. A similar process may be performed to obtain population density estimates for other high resolution cells of the geographic region.

With reference again to FIGS. 2 and 3, the method 300 may include mapping 356 the population density estimates of the high resolution cells of the geographic region (e.g., high resolution cells 412 of FIGS. 4a-4b, only one being shown) into one or more resultant images 268 which may be appropriately stored in storage 212. For instance, FIG. 6b presents a resultant image of a portion of Kabul, Afghanistan that includes a plurality of high resolution population density estimation cells (e.g., 100 m cells) generated using the utilities disclosed herein. Each high resolution cell may be appropriately colored, shaded, etc. to connote the particular population density or population density range represented by the corresponding high resolution cell. In FIG. 6b, it can be seen how the high resolution cells closest to the center of the image are more brightly shaded indicating that greater population densities are found in the center of the image. For reference, FIG. 6a presents another image of the portion of Kabul, Afghanistan from FIG. 6b but with low resolution population density estimation cells (e.g., 1000 m cells), such as those obtained from LandScan or the like. It can be seen how the high resolution cells in FIG. 6b generated using the utilities disclosed herein advantageously provide analysts and the like with more fine-grained population density estimates of a desired geographic region.

In some situations, the geographic scope of the population density estimates of the high resolution cells of a particular geographic area may exceed that of the population density estimates of the low resolution cells. For instance, it can be seen how the relatively lighter portions in FIGS. 6b (e.g., indicating higher population densities) expand geographically farther out than do the lighter portions in FIG. 6a. Thus, it may be beneficial to reallocate or otherwise constrain such portions of the high resolution cells to more closely correspond with the geographic scope of the corresponding low resolution cells.

In one arrangement, a Dasymetric reallocation process may be performed to more realistically place the high resolution cells over appropriate portions of the geographic region or area. For instance, for each particular low resolution cell of a geographic area (e.g., first low resolution cell 404 of FIG. 4b), the population density estimates of each of the high resolution cells (e.g., high resolution cells 412, only one being shown) within the low resolution cell may be obtained (e.g., $e_1$, $e_2$, ... $e_n$) and then normalized in any appropriate manner into normalized values (e.g., $ee_1$, $ee_2$, ... $ee_n$, where $\Sigma ee_1, ee_2, \ldots ee_n = 1$). The original population density estimate of the larger, low resolution cell may then be multiplied by each of the various normalized values to obtain Dasymetric population density estimates for each of the smaller, high resolution cells that substantially limit the geographic scope of the population density estimates of the smaller cells to that of the larger cell. For instance, FIG. 6c presents another image similar to that in FIG. 6b, but where the high resolution cells are appropriately colored, shaded, etc. to depict their respective Dasymetric population density estimates for purposes of generally constraining the geographic scope of the high resolution cells to that of the corresponding low resolution cells within which the high resolution cells are located.

It will be readily appreciated that many additions and/or deviations may be made from the specific embodiments disclosed in the specification without departing from the spirit and scope of the invention. For instance, while the utilities disclosed herein have been discussed in the context of population density estimates, it is to be understood that the teachings may be applied to obtain finer grain, high resolution density estimates of other metrics such as population wealth metrics, building count, and/or the like.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment. Still further, any use of "first," "second," "third," etc. herein does not necessarily connote any specific order or arrangement of components and/or processes disclosed herein and has merely be used to facilitate understanding of the teachings presented herein.

The utilities and related embodiments disclosed herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a non-volatile memory device, a composition of matter affecting a machine-readable propagated signal, or a combination of one or more of them. In this regard, the disclosed utilities may encompass one or more apparatuses, devices, and machines for processing data, including by way of example a programmable processor, a computer, or multiple processors or computers. In addition to hardware, the utilities may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., construction of the first and second hierarchical data structures and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

What is claimed is:

1. A method for use in generating population density data sets of a geographic region from overhead imagery data, comprising:
    identifying areas of built-up structures in at least one input overhead image of a geographic region;
    obtaining population density estimates of a plurality of first portions of the geographic region; and
    with a processor, using the areas of built-up structures in the at least one input overhead image within the first portions to allocate the population density estimates across a plurality of second portions within the first portions, wherein the using comprises:
        obtaining a plurality of multi-scale morphological image descriptors for each of a respective plurality of pixels of the areas of built-up structures in the at least one input overhead image of the geographic region;
        training, with the processor, a linear model with a) the plurality of population density estimates of the plurality of first portions and b) the multi-scale morphological image descriptors within each of the plurality of first portions to obtain a plurality of respective weighting factors; and
        using the weighting factors to allocate the population density estimate of each first portion across the plurality of second portions of the first portions.

2. The method of claim 1, wherein the training includes:
    decomposing the multi-scale morphological image descriptors within each of the first portions into a respective plurality of first vectors that each include a plurality of entries, wherein each entry includes a value that represents a frequency of one of a plurality of fixed values of the multi-scale morphological image descriptors within a respective one of the first portions; and
    combining the plurality of first vectors into a matrix.

3. The method of claim 2, wherein the training includes:
    generating a second vector that includes a plurality of entries, wherein each entry includes a value that represents one of the population density estimates of a respective one of the plurality of first portions of the geographic region.

4. The method of claim 3, wherein the linear model comprises a difference between a) the second vector and b) a product of the matrix and a third vector that includes a plurality of entries, and wherein the training includes:
    determining a particular plurality of values of the respective plurality of entries of the third vector that minimizes the difference, wherein the particular plurality of values is the plurality of weighting factors.

5. The method of claim 4, wherein the plurality of weighting factors are arranged in a weighting vector, and wherein the using the weighting factors to allocate the population density estimate of the first portions across the plurality of second portions includes, for each second portion:
    decomposing the multi-scale morphological image descriptors within the second portion into a fourth vector that includes a plurality of entries, wherein each entry includes a value that represents a frequency of one of the plurality of fixed values of the multi-scale morphological image descriptors within the second portion;
    obtaining an inner product of the fourth vector and the weighting vector; and
    multiplying the inner product by a total quantity of pixels in the second portion of the at least one input overhead image to obtain the population density estimate for the second portion.

6. The method of claim 1, further comprising:
    mapping the plurality of population density estimates of the respective plurality of second portions into a resultant image of the geographic region.

7. The method of claim 1, further comprising for each first portion of the geographic region:
    using the population density estimate of the first portion to constrain the population density estimates of the second portions of the first portion.

8. The method of claim 7, wherein the using the population density estimate of the first portion to constrain the population density estimates of the second portions of the first portion includes:
    normalizing the population density estimates of the second portions into a plurality of normalized population density estimates; and
    multiplying the population density estimate of the first portion by the normalized population density estimates to obtain corrected population density estimates for the second portions.

9. The method of claim 1, wherein the at least one input overhead image comprises a spatial resolution of no greater than 10 meters.

10. The method of claim 9, wherein the at least one input overhead image comprises a spatial resolution of no greater than 2 meters.

11. The method of claim 1, wherein the first and second portions are squares.

12. A method for use in generating population density data sets of a geographic region from overhead imagery data, comprising:
    identifying areas of interest in at least one input overhead image of a geographic region;
    generating, with a processor for each first portion of a plurality of first portions of the geographic region, a first vector of entries that respectively indicate the frequency of each of a plurality of different multi-scale image descriptors in the areas of interest in the first portion;
    combining the first vectors of the plurality of first portions into a matrix;
    generating, with the processor for each first portion, a second vector of entries that respective indicate population density estimates for the plurality of first portions of the geographic region;
    determining, with the processor, a third vector of weighting values that respectively minimize a difference between a) the second vector and b) a product of the matrix and the vector of weighting values; and
    with the processor, using the third vector of weighting values to allocate the population density estimates of the plurality of first portions across a plurality of second portions within each of the first portions.

13. The method of claim 12, wherein the using comprises:
    generating, with the processor for each second portion of the plurality of second portions, a fourth vector of entries that respectively indicate the frequency of each of the plurality of different multi-scale image descriptors in the areas of interest in the second portion; and manipulating the fourth vector of entries with the third vector of weighting values to obtain population density estimates for each second portion of the plurality of second portions.

14. The method of claim 13, wherein the manipulating includes:

obtaining an inner product of the fourth vector and the third vector of weighting values; and multiplying the inner product by a total quantity of pixels in the second portion of the at least one input overhead image to obtain the population density estimate for the second portion.

15. The method of claim 12, further comprising:

mapping the plurality of population density estimates of the respective plurality of second portions into a resultant image of the geographic region.

16. The method of claim 12, further comprising for each first portion of the geographic region:

using the population density estimate of the first portion to constrain the population density estimates of the second portions of the first portion.

17. The method of claim 16, wherein the using the population density estimate of the first portion to constrain the population density estimates of the second portions of the first portion includes:

normalizing the population density estimates of the second portions into a plurality of normalized population density estimates; and multiplying the population density estimate of the first portion by the normalized population density estimates to obtain corrected population density estimates for the second portions.

18. The method of claim 12, wherein the areas of interest are built-up structures.

* * * * *

UNITED STATES PATENT AND TRADEMARK OFFICE
CERTIFICATE OF CORRECTION

PATENT NO. : 9,672,424 B2
APPLICATION NO. : 14/976400
DATED : June 6, 2017
INVENTOR(S) : Gueguen Page 1 of 1

It is certified that error appears in the above-identified patent and that said Letters Patent is hereby corrected as shown below:

In the Specification

Column 14, Line 15, delete "dand wresults" and insert therefore --d and w results--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*